(12) United States Patent
Jaerleberg

(10) Patent No.: US 11,774,317 B2
(45) Date of Patent: Oct. 3, 2023

(54) TRANSMITTER, SYSTEM, FORMWORK ELEMENT, METHOD FOR TRANSMITTING DATA AND METHOD FOR PREDICTING STRESS ON A FORMWORK ELEMENT

(71) Applicant: Peri SE, Weissenhorn (DE)

(72) Inventor: Mikael Jaerleberg, Bullaren (SE)

(73) Assignee: Peri SE, Weissenhorn (DE)

( * ) Notice: Subject to any disclaimer, the term of this patent is extended or adjusted under 35 U.S.C. 154(b) by 91 days.

(21) Appl. No.: 17/311,218

(22) PCT Filed: Nov. 11, 2019

(86) PCT No.: PCT/EP2019/080832
§ 371 (c)(1),
(2) Date: Jun. 4, 2021

(87) PCT Pub. No.: WO2020/114721
PCT Pub. Date: Jun. 11, 2020

(65) Prior Publication Data
US 2022/0026306 A1  Jan. 27, 2022

(30) Foreign Application Priority Data

Dec. 4, 2018 (EP) .................... 18210078

(51) Int. Cl.
*G01M 5/00* (2006.01)
*E04G 11/08* (2006.01)
(Continued)

(52) U.S. Cl.
CPC .......... *G01M 5/0041* (2013.01); *E04G 11/08* (2013.01); *E04G 17/06* (2013.01);
(Continued)

(58) Field of Classification Search
CPC ... G01M 5/0083; G01M 5/0041; E04G 11/08; E04G 17/06; E04G 2009/028; G01L 19/0046
See application file for complete search history.

(56) References Cited

U.S. PATENT DOCUMENTS

| 3,627,943 | A | * | 12/1971 | Blumer | ................. | B29C 45/681 200/61.42 |
| 5,041,987 | A | * | 8/1991 | Kuwahara | ............ | G01N 33/383 374/53 |
| 2017/0254202 | A1 | * | 9/2017 | Kern | ....................... | E21D 11/10 |

FOREIGN PATENT DOCUMENTS

| CN | 206636208 | | 11/2017 |
| DE | 202008011345 | U1 | 12/2008 |

(Continued)

OTHER PUBLICATIONS

Peri Gmbh, "Self-Leveling Slab Formwork Tables Boost Efficiency", Concrete International, (Jun. 30, 2011), pp. 1-3, URL: http://www.largoconcrete.com/wp-content/uploads/2017/04/2011-Self-Leveling-Slab-Formwork-Tables.pdf, (Apr. 18, 2019), XP055582393.

*Primary Examiner* — Natalie Huls
*Assistant Examiner* — Cynthia L Davis
(74) *Attorney, Agent, or Firm* — SLEMAN & LUND LLP

(57) ABSTRACT

A transmitter for predicting stress on a formwork element during and/or after pouring a building material, in particular concrete, into a space enclosed by a formwork including the formwork element, the formwork element comprising a form face and a support structure which is attached to the form face and supporting the form face, wherein the form face is separated from or integrated into the support structure, the system comprising data acquisition means, at least one sensor unit, a control unit and a transmission unit.

16 Claims, 8 Drawing Sheets

(51) Int. Cl.
*E04G 17/06* (2006.01)
*G01L 19/00* (2006.01)
*E04G 9/02* (2006.01)

(52) U.S. Cl.
CPC ....... *G01L 19/0046* (2013.01); *G01M 5/0083* (2013.01); *E04G 2009/028* (2013.01)

(56) References Cited

FOREIGN PATENT DOCUMENTS

| | | | |
|---|---|---|---|
| DE | 102016212220 | | 1/2017 |
| EP | 3216979 | A1 | 9/2017 |
| EP | 3404205 | | 11/2018 |
| JP | H06322816 | A * | 11/1994 |
| JP | H07217204 | A * | 8/1995 |
| KR | 20090016780 | | 2/2009 |
| KR | 20130070874 | | 6/2013 |
| KR | 20180023149 | | 3/2018 |

* cited by examiner

TRANSMITTER, SYSTEM, FORMWORK ELEMENT, METHOD FOR TRANSMITTING DATA AND METHOD FOR PREDICTING STRESS ON A FORMWORK ELEMENT

FIELD OF THE INVENTION

The present invention relates to a transmitter for predicting stress on a formwork element. Furthermore, the present invention relates to a system for predicting stress on a formwork element. In addition, the present invention relates to a formwork element for use in a formwork.

Furthermore, the present invention relates to a method for transmitting data for predicting stress on a formwork element.

In addition, the present invention relates to a method for predicting stress on a formwork element.

BACKGROUND OF THE INVENTION

When pouring a building material into a formwork structure comprising a plurality of formwork elements interconnected to each other, an important aspect is to monitor stress on said formwork elements that is induced into the formwork elements by the building material.

When casting concrete there is a risk that the concrete form is subjected to loads it cannot handle. This can lead to formwork failure. The concrete formwork geometry could change leading to a flawed end product, for example curved walls or in the worst case scenario, an ultimate collapse of the entire formwork structure.

An uneven load distribution within the formwork structure could also lead to local failures or an unwanted redistribution of loads. One or more tie rods taking up more load than expected can lead to instant tie rod failure.

Without knowing the strain or loads the formwork is subjected to, one has to fill the formwork very slowly or divide the pour into multiple stages, letting the concrete harden or at least solidify between each stage.

Dividing the pour into multiple stages often leads to visible joints, so-called cold joints, or variations of surface color and structure creating an end product of lesser quality.

Pouring speed and time is not only a factor affecting the physical end result, it is also very closely tied to the economical success of the operation. Hence, it is of interest to the contractor to fill the formwork and do the pour as quick and effective as possible while not jeopardizing the end result or the form place safety.

KR 20090016780 discloses a mold deformation detecting apparatus which is configured to detect deformation of a mold which supports a load when concrete is put into the mold and warn of danger so as to prevent safety accidents. A mold deformation detecting apparatus includes a detector and a controller. The detector detects a motion of a mold. The controller receives a signal from the detector and checks whether the mold is deformed. The frontend of the detector has a sensing bar in close proximity to the mold. The apparatus detects mold deformation according to whether the sensing bar is rotated.

KR 20130070874 discloses a mold collapse sign detecting device comprising a clamp, a sensor, an A/D converter, a microcontroller, and a warning unit. The state in which the clamp is interlocked to a mold frame is detected by the sensor. Detected data is outputted from the sensor in a predetermined time after detecting the interlocking of the clamp and is memorized as a standard value. Change value applied to the mold frame is calculated by periodically comparing the detected data and the standard value. When the change value exceeds a critical value, a warning signal is outputted.

Consequently, there is a need to further improve systems and methods for predicting stress on a formwork element during and/or after pouring a building material into a space enclosed by a formwork.

SUMMARY OF THE INVENTION

The present invention relates to a transmitter for predicting stress on a formwork element during and/or after pouring a building material, in particular concrete, into a space enclosed by a formwork, to a system for predicting stress on a formwork element during and/or after pouring a building material, in particular concrete, into a space enclosed by the framework, to a formwork element for use in a formwork, to a method for transmitting data for predicting stress on a formwork element during and/or after pouring a building material, in particular concrete, into a space enclosed by the formwork and to a method for predicting stress on a formwork element.

Further embodiments of the present invention are subject of the further sub-claims and of the following description, referring to the drawings.

An aspect of the present invention relates to a transmitter for predicting stress on a formwork element during and/or after pouring a building material, in particular concrete, into a space enclosed by a formwork including the formwork element, the formwork element comprising a form face and a support structure which is attached to the form face and supporting the form face, wherein the form face is separated from or integrated into the support structure.

The transmitter comprises the formwork element and data acquisition means comprising at least one sensor unit configured to acquire data in relation to the stress exerted on the formwork element by the building material, a control unit configured to control the at least one sensor unit and/or to process the acquired data, and a transmission unit configured to transmit the acquired data to a device located outside the formwork element, wherein the control unit and the transmission unit are arranged within the support structure, and wherein the at least one sensor unit is arranged at least partially within the support structure.

A further aspect of the present invention relates to a system for predicting stress on a formwork element during and/or after pouring a building material, in particular concrete, into a space enclosed by a formwork including the formwork element, comprising the transmitter and the device configured to receive the acquired data.

A further aspect of the present invention relates to a formwork element for use in a formwork, comprising a form face and a support structure which is attached to the form face and supporting the form face, wherein the form face is separated from or integrated into the support structure, the formwork element comprising data acquisition means comprising at least one sensor unit configured to acquire data in relation to the stress exerted on the formwork element by the building material, a control unit configured to control the at least one sensor unit and/or to process the acquired data, and a transmission unit configured to transmit the acquired data to a device located outside the formwork element, wherein the control unit and the transmission unit are arranged within the support structure, and wherein the at least one sensor unit is arranged at least partially within the support structure.

A further aspect of the present invention relates to a method for transmitting data for predicting stress on a formwork element during and/or after pouring a building material, in particular concrete, into a space enclosed by a formwork including the formwork element, the formwork element comprising a form face and a support structure which is attached to the form face and supporting the form face.

The form face is separated from or integrated into the support structure, the method comprising the steps of acquiring data in relation to the stress exerted on the formwork element by the building material by means of at least one sensor unit of a data acquisition means, controlling the at least one sensor unit by means of a control unit and/or processing the acquired data, wherein the control unit and the transmission unit are arranged within the support structure.

The at least one sensor unit is arranged at least partially within the support structure, and transmitting the acquired data to a device located outside the formwork element by a transmission unit.

A further aspect of the present invention relates to a method for predicting stress on a formwork element during and/or after pouring a building material, in particular concrete, into a space enclosed by a formwork including the formwork element, the method comprising the method for transmitting data for predicting stress on a formwork element according to the invention, and further comprising receiving the acquired data by means of the device.

The idea of the present invention is to acquire the relevant data by the data acquisition means, process the data and transmit it to a device located outside the formwork element such that a user receives live data on the stress exerted on the formwork elements by the building material being poured into the formwork thus enabling the user to adjust e.g. a pouring speed and other relevant parameters.

Due to the fact that the system comprises the transmitter, the control unit and the device, a plurality of datasets can be taken into account when analyzing the pour of the building material into the formwork such as known data about the formwork, currently obtained data of the ongoing pour and data on all earlier pours that the system has monitored.

The properties of standardized formwork parts are well-known to any supplier of such equipment. The properties can be easily described and do not change due to the normal temperature changes, time or any other external factor during normal use. The properties of the formwork form face, the distances between e.g. tie rods and other fasteners in any given section of the formwork are known as well as the dimensions such as height, width, and depth of the formwork construction as a whole.

The formwork can thus be said to be a system of very well-standardized parts put together in a very well-described way forming a known unit.

The invention thus uses the concrete form, i.e. the formwork elements, as an integrated monitoring system where the formwork elements themselves act as parts of the sensing mechanism measuring the effect of the fresh concrete pressure on the formwork elements. Information about the formwork elements respective position in the total formwork construction is also used for the analysis.

According to an embodiment, the device is configured to analyze the data received from the data acquisition means and to display an analysis result to a user via a graphical user interface, and wherein the device is further configured to provide instructions to the user for handling a pouring process.

The user is thus provided with a simple and easy to use graphical user interface indicating all relevant parameters of the ongoing pour that is capable of providing instructions to the user for making appropriate adjustments.

According to a further embodiment, the transmission unit is configured to continuously transmit data to the device in duplex communication, and wherein the data is transferrable by cable or wirelessly. Due to the fact that the data is continuously transmitted to the device, accurate and on-time data can be obtained that in turn gives the user an accurate representation of a status of the ongoing pour, in particular with a view to the stress exerted by the building material on the formwork elements.

According to a further embodiment, the device is configured to perform an analysis of the stress on the formwork element during and/or after pouring the building material using the data received from the data acquisition means, and data of previous building material pours monitored by the system. The system is thus capable of continuously monitoring the stress exerted by the building material on the formwork elements, i.e. during and/or after the pour, as the stress varies during different points in time during and after the pour.

According to a further embodiment, the system further comprises a data storage unit configured to store the acquired data, and a data interface configured to connect to a further system, in particular a CAD-system for designing formwork structures. The data obtained during and/or after the pour can thus advantageously be used by the CAD-system when designing objects, e.g. buildings and/or formwork structures.

According to a further embodiment, the at least one sensor unit extends through an opening formed in the support structure, the sensor unit comprising a pressure transducer holding body, a pressure chamber, a pressure sensor, in particular a pressure transducer, arranged at least partially within the pressure transducer holding body and inserted at least partially into or being arranged adjacent to the pressure chamber at a first axial end portion of the pressure chamber and a membrane covering an opening of the pressure chamber at a second axial end portion of the pressure chamber.

The pressure chamber contains a hydraulic fluid and is configured to contact the building material and to perform continuous measurement of lateral pressure on the form face of the formwork element. Said pressure sensor, in particular the pressure transducer, is thus capable of measuring the concrete pressure at well-defined points by being integrated in the formwork parts, wherein the sensor membrane is in contact with the concrete.

According to a further embodiment, the pressure chamber is axially adjustable in position through an opening formed in a base plate of the sensor unit, wherein the sensor unit comprises fixing means configured to lock and unlock the pressure chamber relative to the base plate. The adjustability of the pressure chamber and thus of the sensor unit relative to the formwork element thus enables to use only one sensor unit no matter the thickness of the formwork element, in particular the thickness of a plywood plate that forms a form face in contact with the building material.

According to a further embodiment, the at least one sensor unit is formed by a deflection sensor configured to perform continuous measurement of a deflection of the form face of the formwork element. By being able to measure the deflection of the formwork element by means of the sensor being integrated into the formwork element, an accurate indication of the stress exerted by the building material on the formwork elements can be obtained.

According to a further embodiment, the deflection sensor comprises a push rod extending through an opening formed in the support structure adjacent to the form face of the formwork element, the push rod abutting the form face, wherein the push rod is pre-loaded against the form face by a first spring element. The deflection sensor can thus measure any changes in the position of the form face in relation to a support structure of the formwork element.

According to a further embodiment, the deflection sensor further comprises a magnet lever connected to the push rod at a first end portion of the magnet lever, wherein the magnet lever at its second end portion comprises a first permanent magnet and a second permanent magnet, wherein a hall effect sensor is arranged between the first permanent magnet and the second permanent magnet of the magnet lever, wherein the magnet lever is adapted to move upon movement of the push rod, and wherein the hall effect sensor is configured to detect a movement of the magnet lever. By using the hall effect sensor, an accurate measurement of any movement of the lever caused by a movement of the form face of the formwork element can be obtained.

According to a further development, the at least one sensor unit is formed by a strain gauge configured to measure a load on a tie rod arranged between the formwork element and an adjacent formwork element using compression strain gauge load cells integrated in a tie rod assembly. Thus, an accurate measurement of the load on the tie rod can be performed.

According to a further development, the at least one sensor unit is formed by a temperature sensor configured to measure a temperature of the building material, wherein the temperature sensor forms contact with the building material or is integrated in the pressure sensor unit, and/or a sound sensor is configured to detect formwork movements using an electrostatic capacitor-based microphone attached to the form face.

Therefore, advantageously additional data can be obtained by using the temperature sensor and/or the sound sensor that is usable in the overall analysis of the stress exerted on the formwork elements by the building material. In addition, information on loss of workability and hardening of the concrete can advantageously be obtained by means of the temperature sensor and by recording the sound.

According to a further embodiment, the method for predicting stress on a formwork element further comprises the step of measuring the stress exerted on the formwork at various positions in the formwork by means of a plurality of sensor units. In doing so, a more accurate measurement of various positions across the entire surface of the form phase of the formwork element can be obtained.

According to a further embodiment, the device is configured to perform an analysis of the stress on the formwork element during and/or after pouring the building material using the data received from the data acquisition means and data of previous building material pours monitored by the system.

The data obtained during and/or after the pour can thus advantageously be used by the CAD-system when designing objects, e.g. buildings and/or formwork structures.

The herein described features of the transmitter for predicting stress on a formwork element, the system for predicting stress on a formwork element, the formwork element itself are also disclosed in the method for transmitting data for predicting stress on a formwork element and in the method for predicting stress on a formwork element.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

Unless indicated otherwise, like reference numerals or signs to the figures indicate like elements.

DETAILED DESCRIPTION

Figure 1:
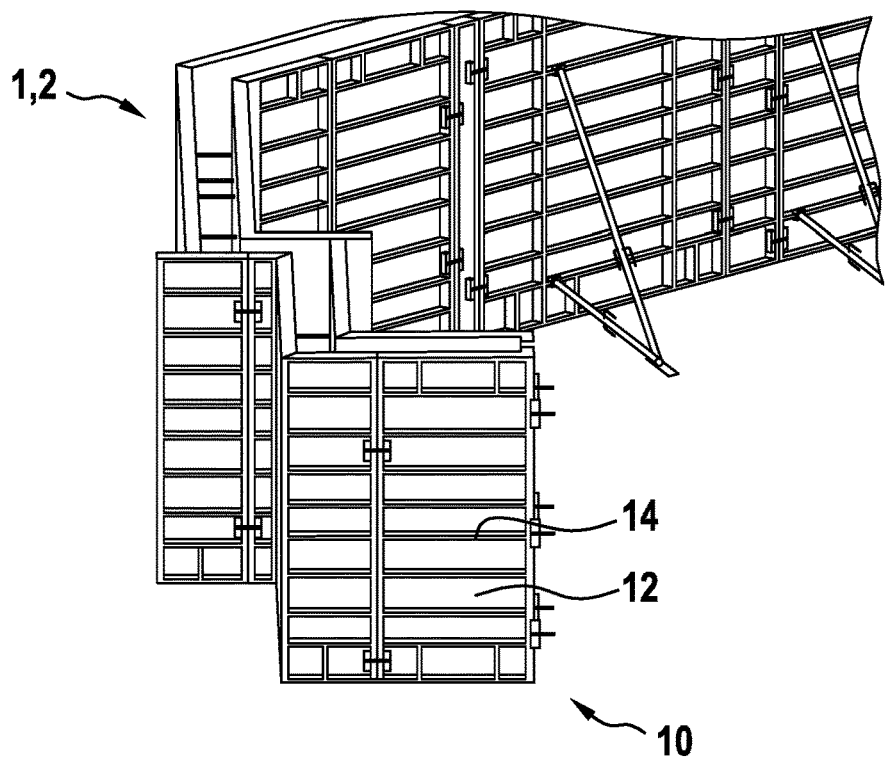
FIG. 1 shows a schematic view of a system for predicting stress on a formwork element according to a preferred embodiment of the invention.

FIG. 1 shows a schematic view of a system for predicting stress on a formwork element according to a preferred embodiment of the invention.

The system 1 for predicting stress on a formwork element 10 during and/or after pouring a building material, in particular concrete, into a space enclosed by the formwork 2 is depicted in FIG. 1. The formwork 2 comprises a plurality of interconnected formwork elements 10, each formwork element 10 comprising a form face 12 and a support structure 14 supporting the form face 12.

Figure 2:
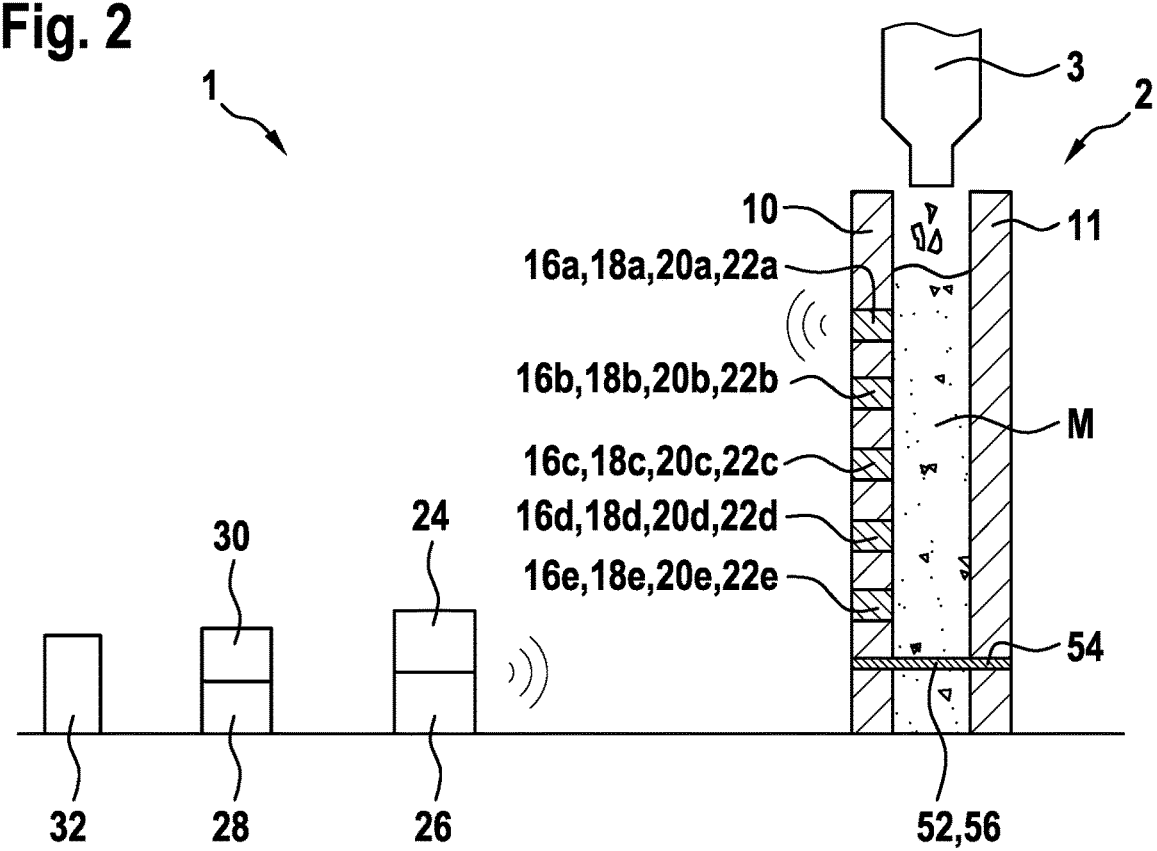
FIG. 2 shows a cross-sectional view of the formwork element comprising a transmitter and a perspective view of external devices according to the preferred embodiment of the invention.

FIG. 2 shows a cross-sectional view of the formwork element comprising a transmitter and a perspective view of external devices according to the preferred embodiment of the invention.

In FIG. 2, building material M, in particular concrete, is poured into the space enclosed by the formwork 2 by means of the pouring device 3. The depicted formwork element 10 comprises the form face 12 and the support structure 14 attached to the form face and supporting the form face, wherein the form face is separated from the support structure. Alternatively, the form face may be integrated into the support structure 14.

The system 1 comprises data acquisition means 16*a*, 16*b*, 16*c*, 16*d*, 16*e*. The data acquisition means 16*a*, 16*b*, 16*c*, 16*d*, 16*e* comprises at least one sensor unit. In the present embodiment, it comprises a plurality of sensor units 18*a*, 18*b*, 18*c*, 18*d*, 18*e* that are each configured to acquire data in relation to the stress exerted on the formwork element 10 by the building material M.

The temperature sensor 18*d* and/or sound sensor 18*e* can be integrated into the one or more of the other sensors 18*a*, 18*b*, 18*c*.

The system 1 further comprises a control unit configured to control the sensor unit. In the present embodiment, there are a plurality of control units, each control unit configured to control a dedicated sensor unit. The control unit 20*a*, 20*b*, 20*c*, 20*d*, 20*e* also processes the acquired data. Alternatively, the control unit 20*a*, 20*b*, 20*c*, 20*d*, 20*e* may either be configured to control the sensor unit 18*a*, 18*b*, 18*c*, 18*d*, 18*e* or process the acquired data.

The system 1 further comprises a transmission unit 22*a*, 22*b*, 22*c*, 22*d*, 22*e* that is configured to transmit the acquired data to a device 24 located outside the formwork element 10. The control unit 20*a*, 20*b*, 20*c*, 20*d*, 20*e* and the transmission unit 22*a*, 22*b*, 22*c*, 22*d*, 22*e* are arranged within the support structure 14.

Each sensor unit 18*a*, 18*b*, 18*c*, 18*d*, 18*e* is arranged partially within the support structure 14. Alternatively, the sensor unit may be fully embedded into the support structure 14.

Moreover, each sensor unit 18*a*, 18*b*, 18*c*, 18*d*, 18*e* is formed by a strain gauge 18*c* configured to measure a load L on a tie rod 52 arranged between the formwork element 10 and an adjacent formwork element 11 using compression strain gauge load cells 54 integrated in a tie rod assembly 56. Alternatively, the compression strain gauge load cells 54 can be arranged in the formwork element where the tie rod 52 is inserted.

A temperature sensor 18*d* is configured to measure a temperature of the building material M, wherein the temperature sensor 18*d* forms contact with the building material M.

Alternatively, the temperature sensor can be integrated in the pressure sensor unit 18*a*, and/or a sound sensor 18*e* configured to detect formwork 2 movements using an electrostatic capacitor-based microphone attached to the form face 12.

The speed of the chemical reactions in the concrete is directly related to the temperature. The sound can be used to determine when the casting started, possibly the location of the concrete surface and the amount of vibration added. Dangerous relocation of the formwork could possibly also be detected.

The device 24 is configured to analyze the data received from each of the data acquisition means 16*a*, 16*b*, 16*c*, 16*d*, 16*e* and to display an analysis result to a user via a graphical user interface 26. The device 24 may alternatively forward the received data to a server (not shown on FIG. 2) via an internet connection, wherein the server performs the data analysis and provides an analysis result to the device.

The relevant data is acquired by the data acquisition means 16*a*, processed and transmitted to the device 24 located outside the formwork element 10 such that a user receives live data on the stress exerted on the formwork element 10 by the building material being poured into the formwork thus enabling the user to adjust e.g. a pouring speed and other relevant parameters.

In addition, e.g. a warning function can be implemented by the device 24 or a further device (not shown in FIG. 2) that may warn the user of immediate danger should this be indicated by the data analysis of the stress exerted on the formwork element 10. Said warning may be issued visually and/or acoustically on the device 24 and/or another device (not shown in FIG. 3) such as a warning light and/or a siren located on the construction site.

The device 24 is further configured to provide instructions to the user for handling a pouring process. Each transmission unit 22*a*, 22*b*, 22*c*, 22*d*, 22*e* is configured to continuously transmit data to the device 24 in duplex communication. The data is transferred wirelessly. Alternatively, the data may be transferred by cable.

The device 24 is configured to perform an analysis of the stress on the formwork element 10 during and after pouring the building material M using the data received from each of the data acquisition means 16*a*, 16*b*, 16*c*, 16*d*, 16*e* and data of previous building material pours monitored by the system. Alternatively, said analysis may be performed by other components (not shown) connected to the device.

Alternatively, the device 24 may be configured to perform the analysis of the stress on the formwork element 10 either during or after pouring the building material.

The system 1 further comprises a data storage unit 28 that is configured to store the acquired data and a data interface 30 configured to connect to a further system 32, in particular a CAD-system for designing formwork structures. The data storage unit 28 is located at the construction site. Alternatively, the data storage unit 28 may be embodied as a web-server connected to the device by an internet connection.

Figure 3:
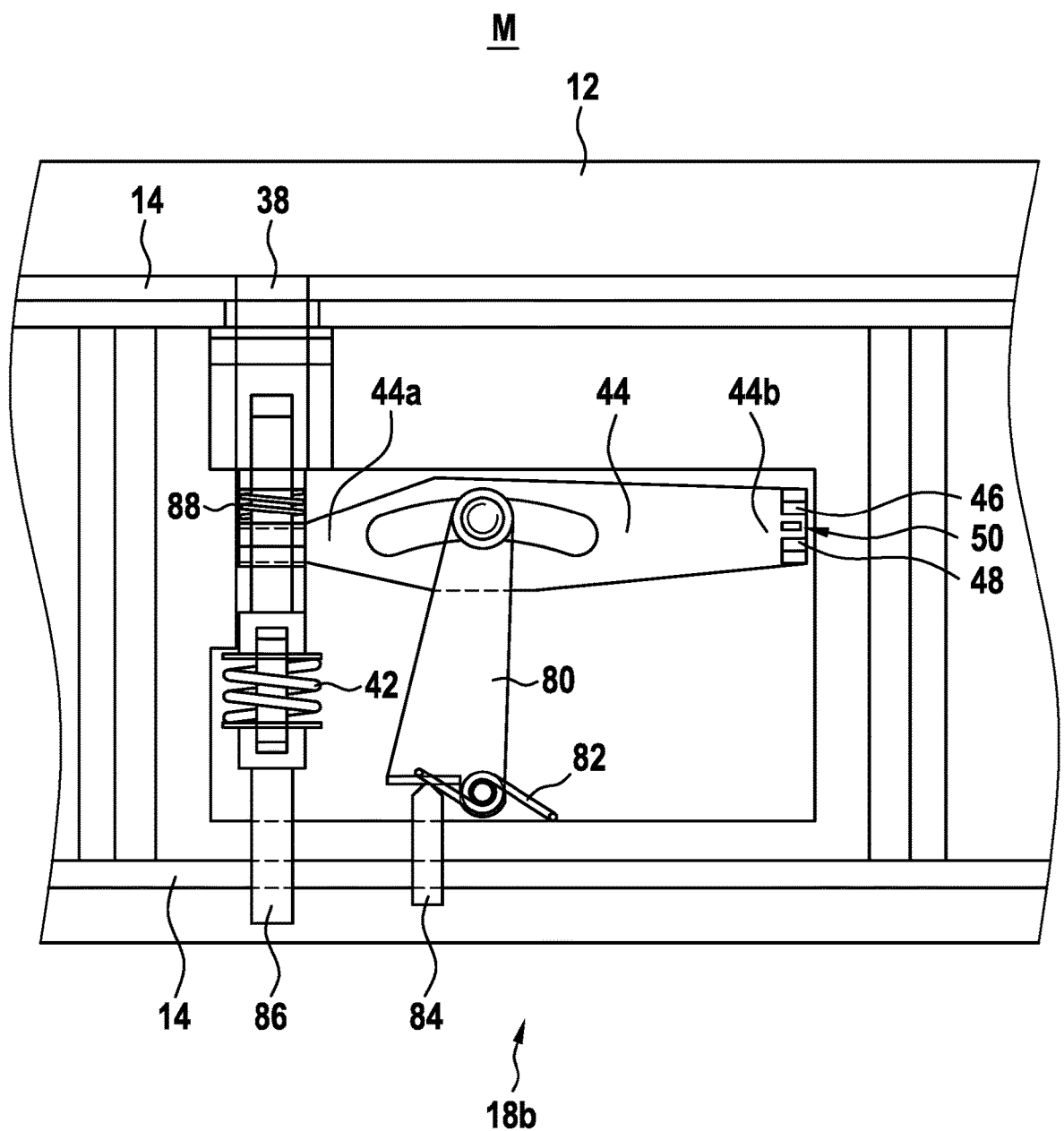
FIG. 3 shows a cross-sectional view of a sensor unit according to the preferred embodiment of the invention.

FIG. 3 shows a cross-sectional view of a sensor unit according to the preferred embodiment of the invention.

The sensor unit 18*b* is formed by a deflection sensor configured to perform continuous measurement of a deflection of the form face 12 of the formwork element 10. Moreover, the sensor unit 18*b* is also configured to measure an oscillation or vibration of the form face 12 of the formwork element 10. This way, information on a vibration and compaction of the concrete can advantageously obtained.

The form face 12 of the formwork element 10 in this configuration acts as a membrane thus enabling measurement over a significantly larger area than is conventionally the case with pressure sensors.

The deflection sensor 18*b* comprises a push rod 38 extending through an opening formed in the support structure 14 adjacent to the form face 12 of the formwork element 10.

The push rod 38 abuts the form face 12, wherein the push rod 38 is pre-loaded against the form face 12 by a first spring element 42.

The deflection sensor 18*b* further comprises a magnet lever 44 connected to the push rod 38 at a first end portion 44*a* of the magnet lever 44.

The magnet lever 44 and its second end portion 44*b* comprises a first permanent magnet 46 and a second permanent magnet 48.

A hall effect sensor 50 is arranged between the first permanent magnet 46 and the second permanent magnet 48 of the magnet lever 44, wherein the magnet lever 44 is adapted to move upon movement of the push rod 38. The hall effect sensor 50 is configured to detect a movement of the magnet lever 44.

The movements detected by the hall effect sensor 50 can e.g. be movements where the form face 12 returns to its original position after the movement or quick oscillations, i.e. vibrations of the form face 12. This is important information for the concrete worker since he can get information on how much the concrete has been vibrated. Vibration of concrete is an integral part of the casting procedure.

Moreover, the magnet lever comprises a slit that is substantially arc-shaped, in which a rod is inserted, that is held by an arm 80 that is preferably fork-shaped, i.e. U-shaped, in order to be able to hold the rod between respective end portions.

The arm 80 is further held in place by a spring against which an amplification set screw 84 is pushed that extends through the support structure 14 of the formwork element 10.

The sensor unit 18*b* further comprises a square nut which follows adjustments of a pre-load screw 86 that extends through the support structure of the formwork element and pre-loads the first spring element 42.

The preload set screw 86 also conveys the rotary motion to the screw (not numbered) that is in contact with the push rod 38. This has the effect that the preload does not create an offset on the magnet lever 44 since it is fastened to the screw with square nuts having the exact same thread pitch as the preload screw. Preloading the push rod 38 with the preload set screw 86 thus does not change the position of the magnet lever 44.

Figure 4:
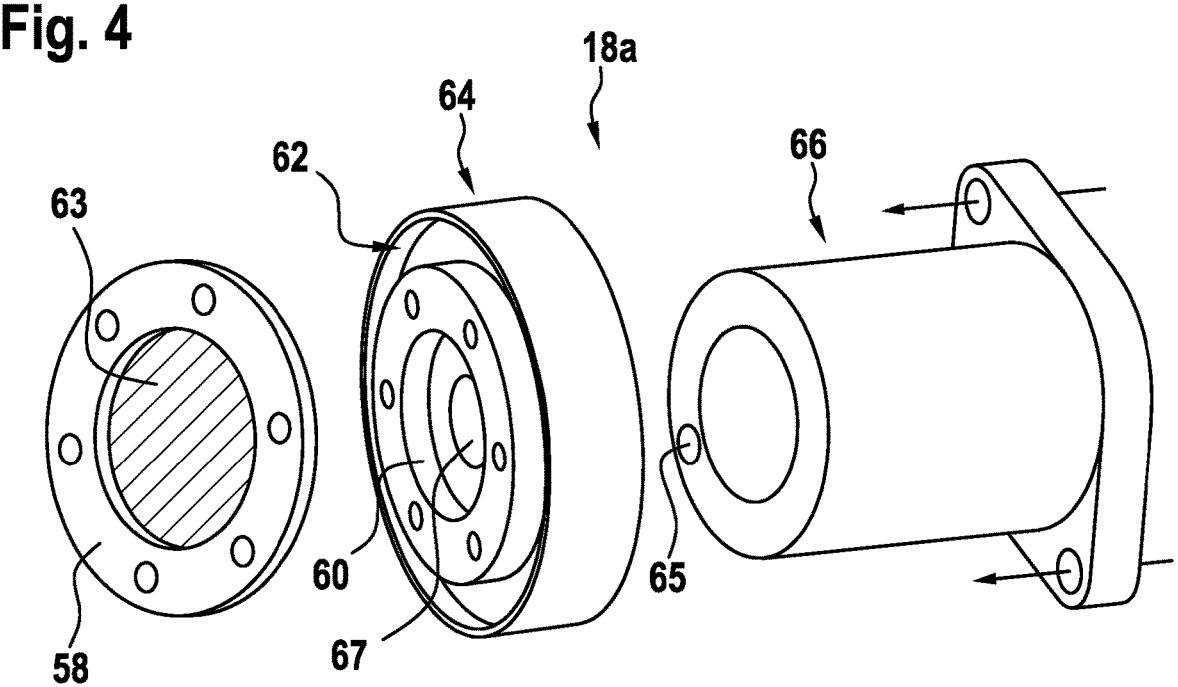
FIG. 4 shows an exploded view of a further sensor unit according to the preferred embodiment of the invention.

FIG. 4 shows an exploded view of a further sensor unit according to the preferred embodiment of the invention.

The sensor unit 18*a* comprises a pressure transducer holding body 66, a pressure chamber 60, a pressure transducer 67, in particular a pressure transducer, arranged partially within the pressure transducer holding body 66 and inserted partially into the pressure chamber 60 at a first axial end portion of the pressure chamber 60.

The sensor unit 18*a* further comprises a membrane 63 covering an opening of the pressure chamber 60 at a second axial end portion of the pressure chamber 60, wherein the pressure chamber 60 contains a hydraulic fluid (not shown in FIG. 4) and is configured to contact the building material and to perform continuous measurement of lateral pressure on the form face of the formwork element.

The pressure transducer holding body 66 further comprises an opening 65 formed at a front face of the pressure transducer holding body. The sensor unit 18*a* moreover comprises a flange 58, wherein in an assembled state of the sensor unit 18*a*, the flange 58 is screwed to a container portion 64 of the sensor unit 18*a* that comprises the pressure chamber 60, wherein the membrane 63 is arranged between the flange 58 and the container portion 64. The opening 65 in the pressure transducer holding body 66 serves such that a screw can be inserted from a given direction in order to fix the container portion 64 to the pressure transducer holding body 66.

This is a very light press-fit. Pressure is then applied to compress the o-ring in an o-ring groove 62 using the screws mentioned in the comment above.

The pressure transducer holding body 66 pushes against the container portion 64 by the means of two screws through holes marked with arrows in FIG. 4. These screws in effect compresses an o-ring in the o-ring groove 62 in FIG. 4. The o-ring creates a water tight seal against the form work element body 14. This solves the problem of how to fasten the sensor assembly without having fasteners subjected to fresh concrete. All assembly and dis assembly can be made from the outside of the formwork.

Figure 5:
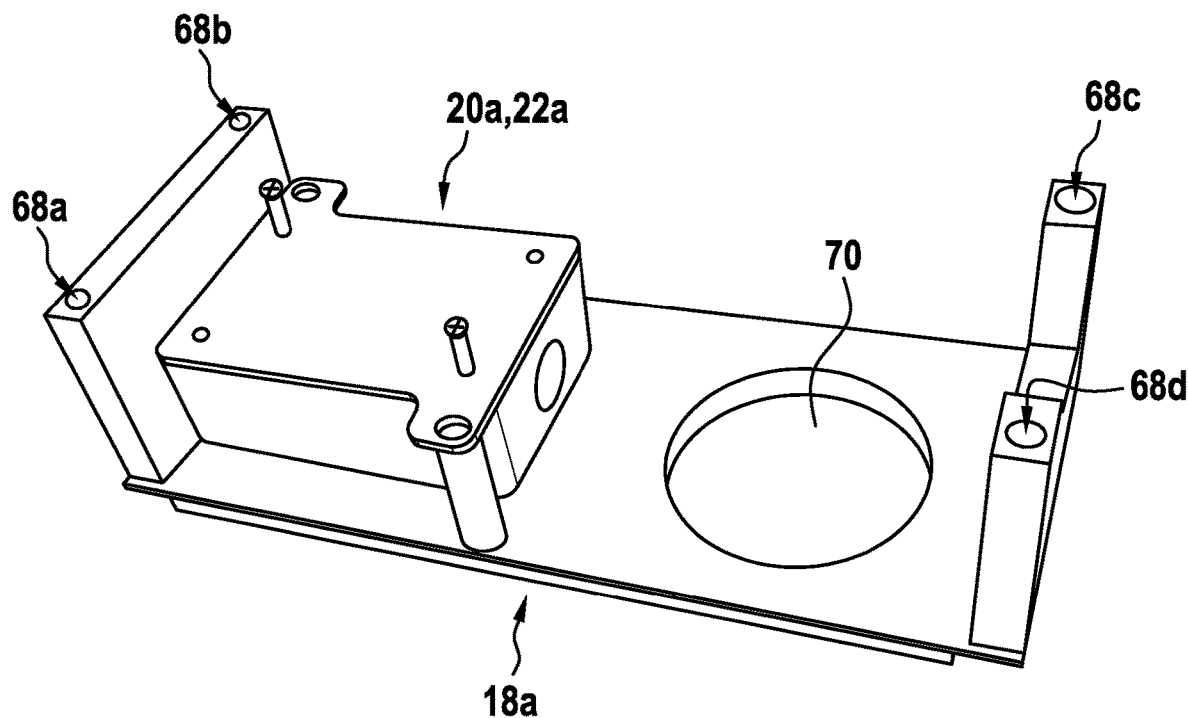
FIG. 5 shows components of the further sensor unit according to the preferred embodiment of the invention.

FIG. 5 shows components of the further sensor unit according to the preferred embodiment of the invention.

The sensor unit 18*a* comprises a base plate in which an opening 70 is formed through which the sensor can be inserted. The sensor unit 18*a* furthermore comprises the control unit 20*a* and the transmission unit 22*a*, which in the present embodiments are housed within a common housing.

The sensor unit 18*a* further comprises mounting means 68*a*, 68*b*, 68*c*, 68*d* that are adapted to receive screws that may be screwed into said mounting means through a wall of the formwork element (not shown in FIG. 5).

Figure 6:
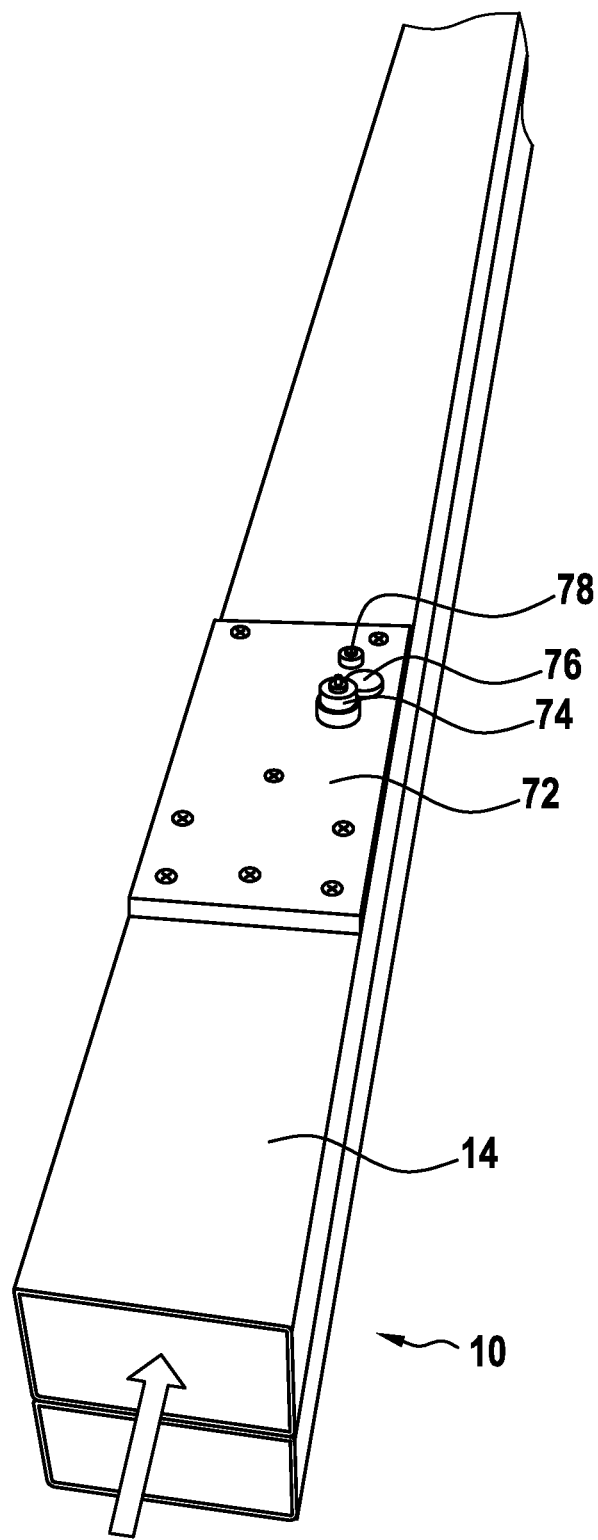
FIG. 6 shows a schematic view of the formwork element comprising the further sensor unit according to the preferred embodiment of the invention.

FIG. 6 shows a schematic view of the formwork element comprising the further sensor unit according to the preferred embodiment of the invention.

The formwork element 10 comprises the support structure 14. In the present embodiment, the support structure is formed by a beam made of a metal material, in particular aluminum, wherein the sensor unit 18*a* is inserted through an opening of the support structure. The sensor unit 18*a* comprises at an outer surface additionally a USB-connector 74, a status indicating light 78 and a button 76.

The button has multiple functions. The button is used to turn the unit on or off, and reset. It can also be used to "force connect". That is to create a measurement and connect immediately to the main unit as the button is pushed so as not to wait for the next scheduled measurement.

Alternatively, other buttons having other functions may be placed on the outside of the sensor unit 18*a*.

Figure 7:
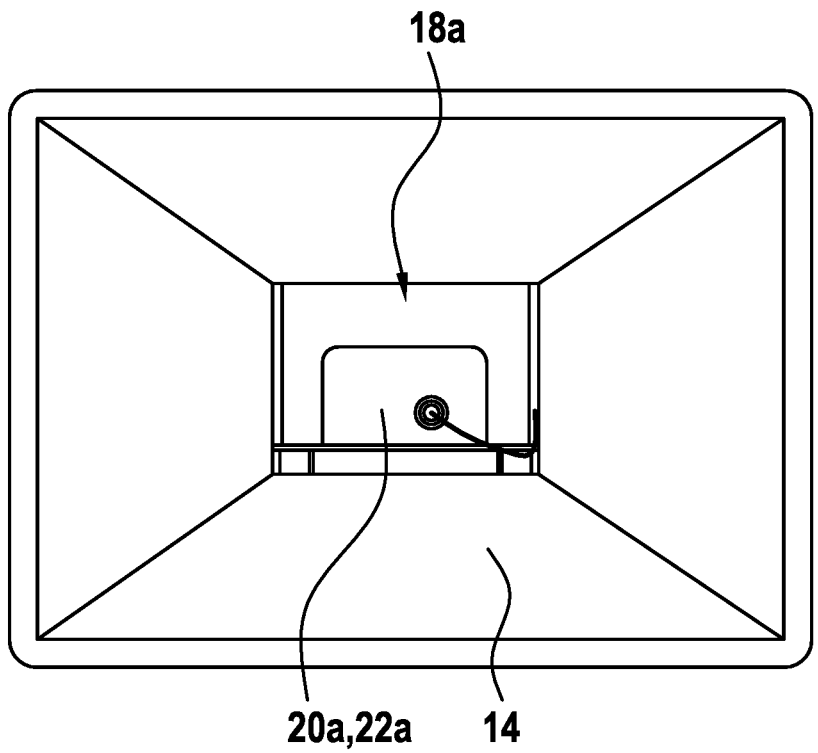
FIG. 7 shows a schematic view of an inside of the formwork element comprising the further sensor unit according to the preferred embodiment of the invention.

FIG. 7 shows a schematic view of an inside of the formwork element comprising the further sensor unit according to the preferred embodiment of the invention.

The sensor unit 18*a* is arranged at an inside of the support structure, said support structure 14 being made of a profile element that is substantially hollow and has a rectangular cross-section. The control unit 20*a* and the transmission unit 22*a* are shown which are connected to the USB-connector on the outside of the support structure by means of a cable.

Figure 8:
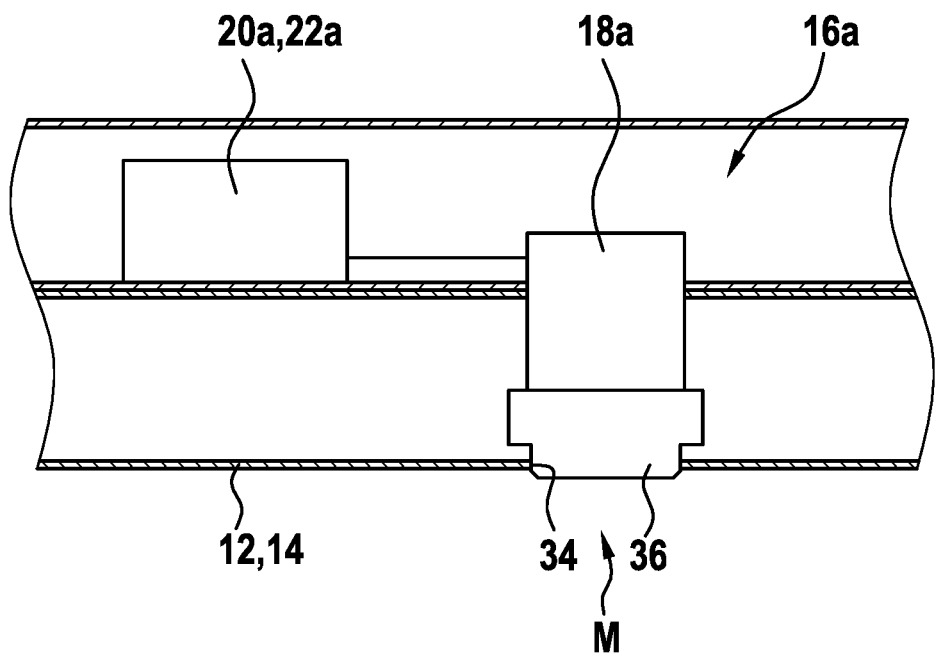
FIG. 8 shows a cross-sectional view of the formwork element comprising the further sensor unit.

FIG. 8 shows a cross-sectional view of the formwork element comprising the further sensor unit.

The sensor unit 18*a* is shown in assembled state in which it is connected to the control unit 20*a* and the transmission unit 22*a*, wherein a membrane 36 extends through an opening 34 of the support structure 14. Thus, building material M that is being poured into the space enclosed by respective formwork elements exerts a substantially lateral pressure on said membrane 36 of the sensor unit 18*a*.

Figure 9:
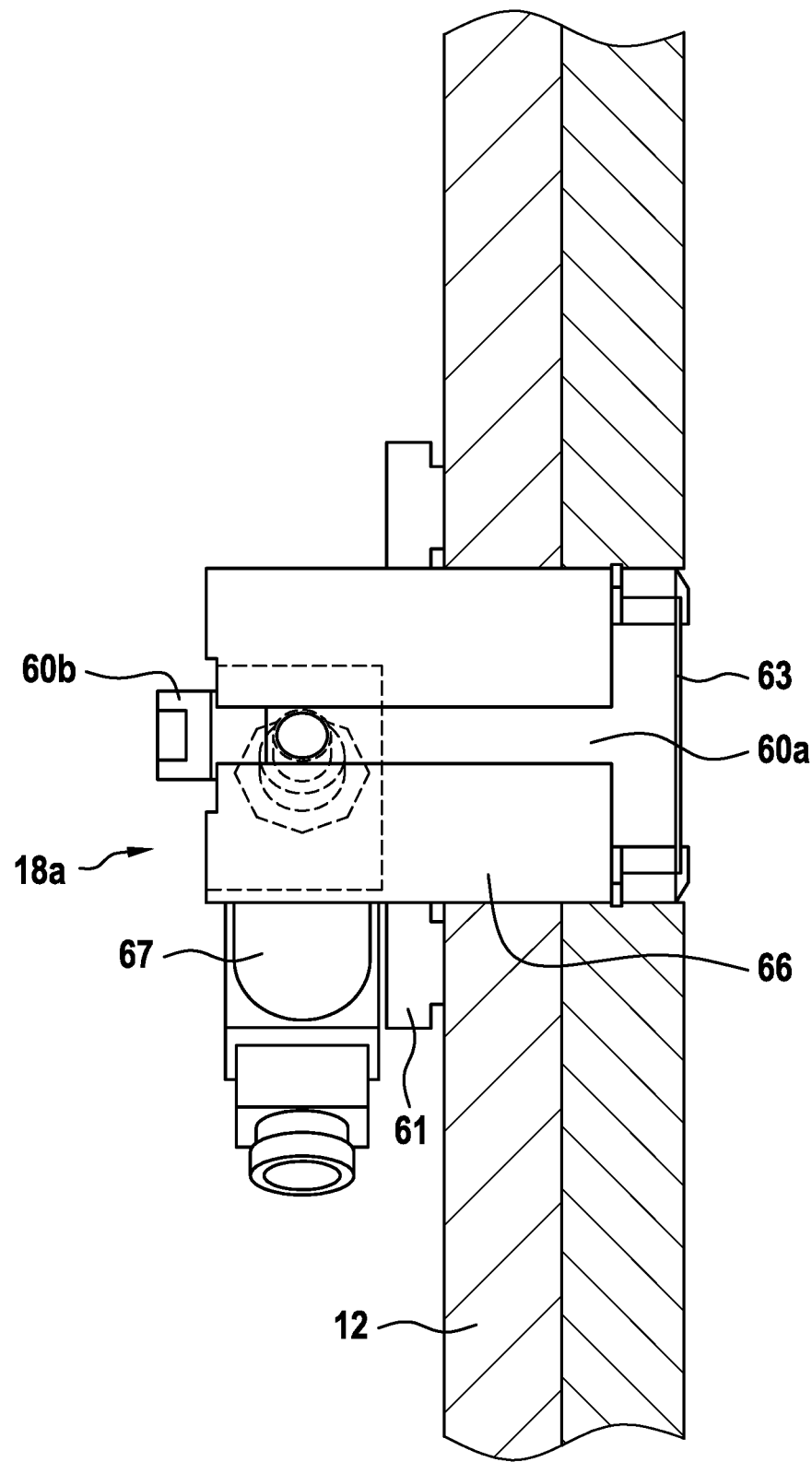
FIG. 9 shows a cross-sectional view of a further sensor unit according to the preferred embodiment of the invention.

FIG. 9 shows a cross-sectional view of a further sensor unit according to the preferred embodiment of the invention. FIG. 9 is a modified version of the pressure sensor 18*a* depicted in FIG. 4. In the present embodiment, the pressure sensor comprises a pressure chamber 60 that is axially adjustable in position through an opening formed in a base plate 61 of the sensor unit 18*a*, wherein the sensor unit 18*a* comprises fixing means configured to lock and unlock the pressure chamber 60 relative to the base plate 61. Moreover, the form face 12 consists of two layers that are arranged back-to-back, said form face being made of a plywood plate. Alternatively the form face 12 may for example be made of steel or plastic.

The pressure chamber 60*a* is formed as a fluid filled cavity. Air vent screw 60*b* communicates with the pressure chamber 60*a* and is adapted to bleed the pressure chamber 60*a*.

The pressure transducer 67 measures a pressure of the fluid disposed in the pressure chamber 60*a*.

Figure 10:
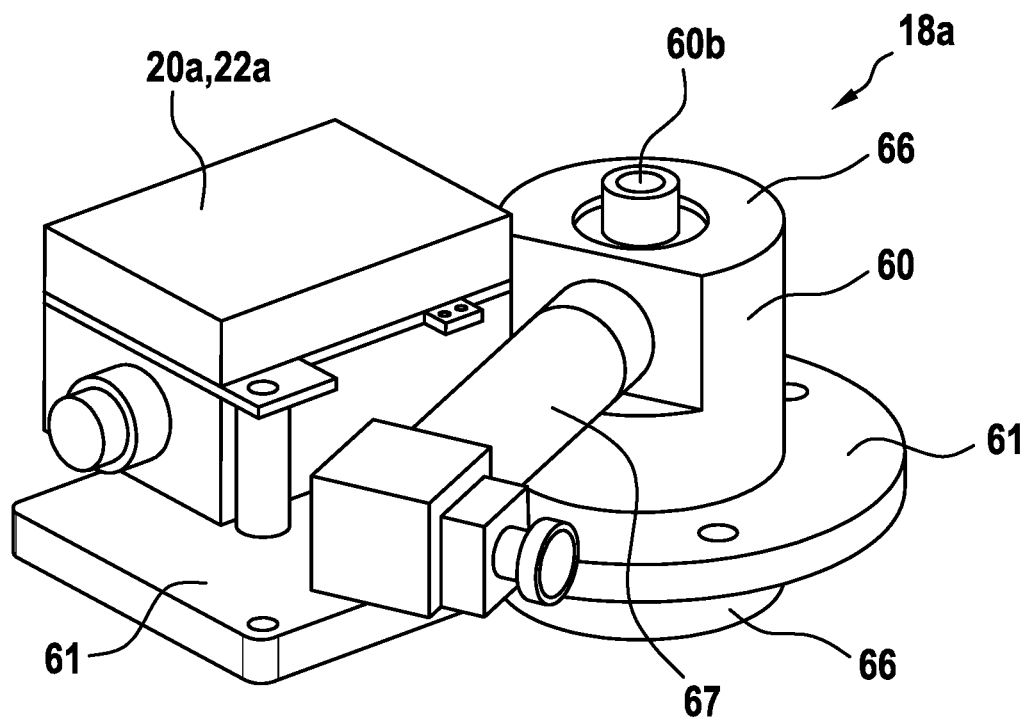
FIG. 10 shows a schematic view of the further sensor unit depicted in FIG. 9 in a first position according to the preferred embodiment of the invention.

FIG. 10 shows a schematic view of the further sensor unit depicted in FIG. 9 in a first position according to the preferred embodiment of the invention. In the present view, the pressure chamber is shown in a first position, in which it is substantially retracted.

Figure 11:
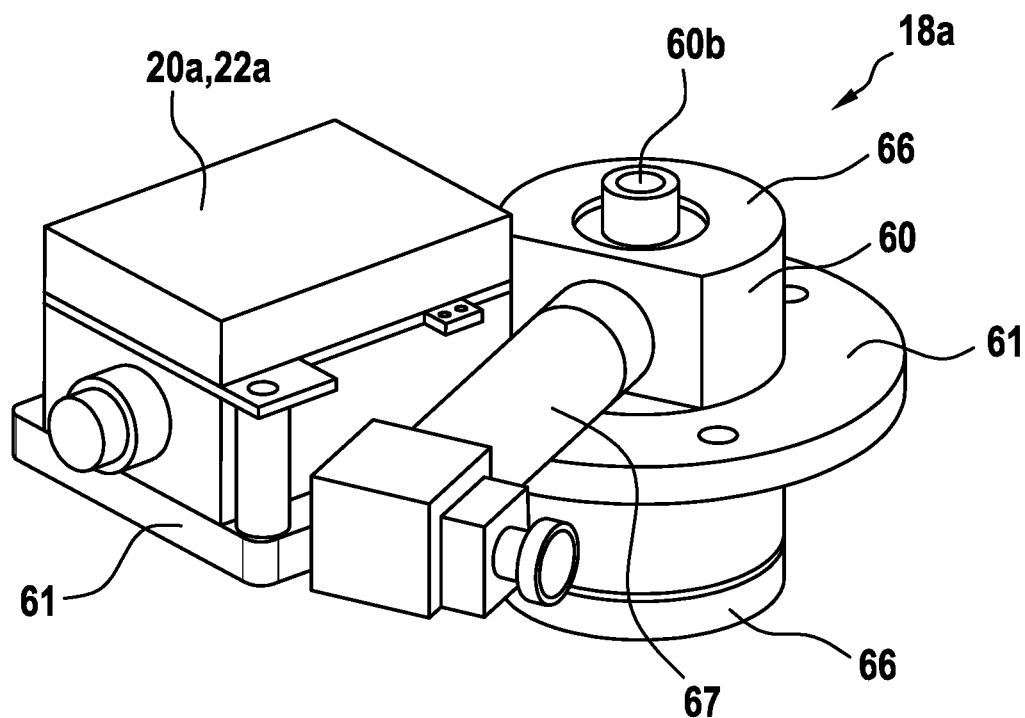
FIG. 11 shows a schematic view of the further sensor unit depicted in FIG. 9 in a second position according to the preferred embodiment of the invention.

FIG. 11 shows a schematic view of the further sensor unit depicted in FIG. 9 in a second position according to the preferred embodiment of the invention.

The pressure chamber 60 in the present depiction is substantially fully extended. This enables the sensor unit 18a to be also used with thicker formwork elements without having to replace the sensor unit 18a with another sensor unit having longer dimensions.

Figure 12:
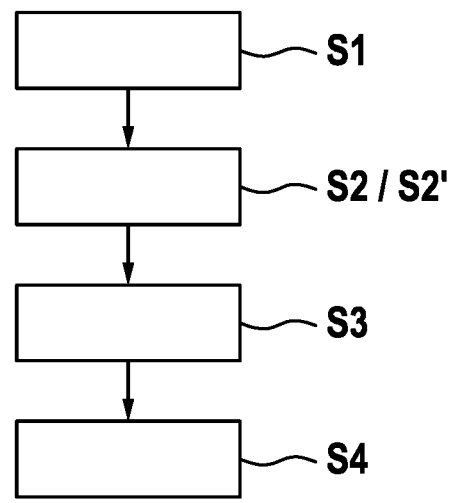
FIG. 12 shows a flow diagram of a method for predicting stress on the formwork element according to the preferred embodiment of the invention.

FIG. 12 shows a flow diagram of a method for predicting stress on the formwork element according to the preferred embodiment of the invention.

The method comprises the steps of acquiring SI data in relation to the stress exerted on the formwork element 10 by the building material M by means of at least one sensor unit 18a, 18b, 18c, 18d, 18e of a data acquisition means 16a, 16b, 16c, 16d, 16e.

The method moreover comprises the step of controlling S2 the at least one sensor unit 18a, 18b, 18c, 18d, 18e by means of a control unit 20a, 20b, 20c, 20d, 20e and/or processing the acquired data S2', wherein the control unit 20a, 20b, 20c, 20d, 20e and the transmission unit 22a, 22b, 22c, 22d, 22e are arranged within the support structure 14, and the at least one sensor unit 18a, 18b, 18c, 18d, 18e is arranged at least partially within the support structure 14.

The method further comprises the step of transmitting S3 the acquired data to the device 24 located outside the formwork element 10 by the transmission unit 22a, 22b, 22c, 22d, 22e.

The method further comprises the step of S4 receiving the acquired data by means of the device 24.

Although the afore-mentioned system has been described in connection with formwork elements of a formwork structure, a person skilled in the art is aware of the fact that the herein described system can of course be applied to other structures in which a stress of a medium against a containing structure is to be monitored.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way.

Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

Generally, this application is intended to cover any adaptations or variations of the specific embodiments discussed herein.

REFERENCE LIST 1 system
2 formwork
3 pouring device
10 formwork element
12 form face
14 support structure
16a, 16b, 16c, 16d, 16e data acquisition means
18a, 18b, 18c, 18d, 18e sensor unit
20a, 20b, 20c, 20d, 20e control unit
22a, 22b, 22c, 22d, 22e transmission unit
24 device
26 graphical user interface
28 storage unit
30 data interface
32 further system
34 opening
36 membrane
38 push rod
40 opening
44 magnet lever
44a first end portion
44b second end portion
46 first permanent magnet
48 second permanent magnet
50 hall effect sensor
52 tie rod
54 compression strain gauge load cells
56 tie rod assembly
58 flange
60, 60a pressure chamber
60b air vent screw
61 base plate
61a fixing means
62 o-ring groove
63 membrane
64 containing portion
65 opening
66 pressure transducer holding body
67 pressure transducer
68a, 68b, 68c, 68d mounting means
70 opening
74 connector
76 button
78 status indicating light
80 arm
84 amplification set screw
86 pre-load screw
M building material
P lateral pressure

The invention claimed is:

1. A formwork element for use in a formwork, comprising:
   a form face;
   a support structure which is attached to the form face and supporting the form face, wherein the form face is separated from or integrated into the support structure; and
   a data acquisition assembly comprising:
      at least one sensor unit configured to acquire data in relation to the stress exerted on the formwork element by a building material, wherein the at least one sensor unit is formed by a deflection sensor configured to perform continuous measurement of a deflection of the form face of the formwork element, wherein the deflection sensor comprises a push rod extending through an opening formed in the support structure adjacent to the form face of the formwork element, the push rod abutting the form face, wherein the push rod is pre-loaded against the form face by a first spring element,
      a control unit configured to control the at least one sensor unit and/or to process the acquired data, and
      a transmission unit configured to transmit the acquired data to a device located outside the formwork element, wherein the control unit and the transmission unit are arranged within the support structure, and wherein the at least one sensor unit is arranged at least partially within the support structure.

2. A system for performing an analysis of stress on a formwork element during and/or after pouring a building material, the system comprising:

the formwork element of claim 1;
a transmitter for predicting stress on the formwork element during and/or after pouring a building material into a space enclosed by a formwork including the formwork element, the transmitter comprising the data acquisition assembly; and
a device configured to receive the acquired data.

3. The system of claim 1, wherein the device is configured to analyze the data received from the data acquisition means and to display an analysis result to a user via a graphical user interface, and wherein the device is further configured to provide instructions to the user for handling a pouring process.

4. The system of claim 1, wherein the transmission unit is configured to continuously transmit data to the device in duplex communication, and wherein the data is transferable by cable or wirelessly.

5. The system of claim 3, wherein the device is configured to perform an analysis of the stress on the formwork element during and/or after pouring the building material using the data received from the data acquisition means and data of previous building material pours monitored by the system.

6. The system of claim 1, further comprising a data storage unit configured to store the acquired data, and a data interface configured to connect to a further system for designing formwork structures.

7. The formwork element of claim 1, wherein the at least one sensor unit extends through an opening formed in the support structure, the sensor unit comprising a pressure transducer holding body, a pressure chamber, a pressure transducer arranged at least partially within the pressure transducer holding body and inserted at least partially into or being arranged adjacent to the pressure chamber at a first axial end portion of the pressure chamber and a membrane covering an opening of the pressure chamber at a second axial end portion of the pressure chamber, wherein the pressure chamber contains a hydraulic fluid and is configured to contact the building material and to perform continuous measurement of lateral pressure on the form face of the formwork element.

8. The formwork element of claim 7, wherein the pressure chamber is axially adjustable in position through an opening formed in a base plate of the sensor unit, wherein the sensor unit comprises fixing means configured to lock and unlock the pressure chamber relative to the base plate.

9. The formwork element of claim 1, wherein the deflection sensor further comprises a magnet lever connected to the push rod at a first end portion of the magnet lever, wherein the magnet lever at its second end portion comprises a first permanent magnet and a second permanent magnet, wherein a hall effect sensor is arranged between the first permanent magnet and the second permanent magnet of the magnet lever, wherein the magnet lever is adapted to move upon movement of the push rod, and wherein the hall effect sensor is configured to detect a movement of the magnet lever.

10. The formwork element of claim 1, further comprising a tie rod assembly comprising a tie rod arranged between the formwork element and an adjacent formwork element, wherein the at least one sensor unit is formed by a strain gauge configured to measure a load on the tie rod using compression strain gauge load cells integrated in the tie rod assembly.

11. The formwork element of claim 1, wherein the at least one sensor unit is formed by a temperature sensor configured to measure a temperature of the building material, wherein the temperature sensor forms contact with the building material or is integrated in the pressure sensor unit, and/or a sound sensor configured to detect formwork movements using an electrostatic capacitor-based microphone attached to the form face.

12. A method for transmitting data for performing an analysis of the stress on a formwork element during and/or after pouring a building material into a space enclosed by a formwork by a system comprising the formwork element and a transmitter for predicting the stress in the formwork element, the formwork element comprising a form face and a support structure which is attached to the form face and supporting the form face, wherein the form face is separated from or integrated into the support structure, the method comprising the steps of:
acquiring data in relation to the stress exerted on the formwork element by the building material by at least one sensor unit of a data acquisition assembly of the transmitter, wherein the at least one sensor unit is formed by a deflection sensor configured to perform continuous measurement of a deflection of the form face of the formwork element, wherein the deflection sensor comprises a push rod extending through an opening formed in the support structure adjacent to the form face of the formwork element, the push rod abutting the form face, wherein the push rod is pre-loaded against the form face by a first spring element;
controlling the at least one sensor unit by a control unit of the transmitter and/or processing the acquired data, wherein the control unit and a transmission unit of the transmitter are arranged within the support structure, and the at least one sensor unit is arranged at least partially within the support structure; and
transmitting the acquired data to a device located outside the formwork element by a transmission unit.

13. The method of claim 12, and further comprising:
receiving the acquired data by means of the device.

14. The method of claim 12, further comprising the step of measuring the stress exerted on the formwork at various positions in the formwork by a plurality of sensor units.

15. A formwork element for use in a formwork, comprising:
a form face;
a support structure attached to the form face and supporting the form face, wherein the form face is separated from or integrated into the support structure; and
a transmitter for predicting stress on the formwork element during and/or after pouring a building material into a space enclosed by a formwork including the formwork element, the transmitter comprising:
at least one sensor unit configured to acquire data in relation to the stress exerted on the formwork element by a building material, wherein the at least one sensor unit includes a deflection sensor configured to perform continuous measurement of a deflection of the form face of the formwork element, the deflection sensor including a push rod extending through an opening formed in the support structure adjacent to the form face of the formwork element, the push rod abutting the form face, wherein the push rod is pre-loaded against the form face by a first spring element,
a control unit configured to control the at least one sensor unit and/or to process the acquired data, and
a transmission unit configured to transmit the acquired data to a device located outside the formwork element, wherein the control unit and the transmission unit are arranged within the support structure, and wherein the at least one sensor unit is arranged at least partially within the support structure.

16. A system, comprising:
the formwork element of claim 15; and
a device configured to receive the acquired data.

* * * * *